United States Patent
Droste et al.

(10) Patent No.: US 7,601,191 B2
(45) Date of Patent: Oct. 13, 2009

(54) APPARATUS FOR VENTING A TRANSMISSION CASE

(75) Inventors: Timothy A. Droste, Howell, MI (US); Clay F. Ramseyer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 11/498,438

(22) Filed: Aug. 3, 2006

(65) Prior Publication Data
US 2008/0028934 A1 Feb. 7, 2008

(51) Int. Cl.
*B01D 47/06* (2006.01)
(52) U.S. Cl. .......................... 55/385.3; 55/413; 55/414; 55/415; 96/380; 96/384; 96/385; 96/386; 181/231; 181/256; 181/229; 181/252
(58) Field of Classification Search .................... 96/380, 96/381–388; 55/385.3, 413–415; 181/231, 181/256, 229, 252
See application file for complete search history.

(56) References Cited

U.S. PATENT DOCUMENTS

| | | | | | |
|---|---|---|---|---|---|
| 3,742,682 | A | * | 7/1973 | Ligutom | 96/265 |
| 3,957,468 | A | * | 5/1976 | Voth et al. | 96/358 |
| 4,341,540 | A | * | 7/1982 | Howerin | 55/307 |
| 4,400,355 | A | * | 8/1983 | Donnelly et al. | 422/170 |
| 5,122,168 | A | * | 6/1992 | Torres | 96/329 |
| 6,267,804 | B1 | * | 7/2001 | Marlowe | 96/237 |
| 6,544,320 | B2 | * | 4/2003 | Wong | 96/240 |
| 6,767,378 | B2 | * | 7/2004 | Nishiyama et al. | 55/309 |
| 7,141,101 | B2 | * | 11/2006 | Amann | 96/380 |
| 2007/0245700 | A1 | * | 10/2007 | Zhu | 55/418 |

* cited by examiner

*Primary Examiner*—Duane Smith
*Assistant Examiner*—Minh-Chau T Pham
(74) *Attorney, Agent, or Firm*—David B. Kelley; MacMIllan, Sobanski & Todd, LLC

(57) ABSTRACT

A system for separating contaminants from an air stream entering a sealed case through a vent fitting communicating to the interior cavity of the case includes a contaminant separator having a housing enclosing a chamber, an inlet and outlet communicating with the chamber, a baffle located in the chamber and producing a constricted fluid flow passageway between the inlet and the outlet.

8 Claims, 3 Drawing Sheets

APPARATUS FOR VENTING A TRANSMISSION CASE

BACKGROUND OF THE INVENTION

The preferred embodiment relates generally to a case that contains the components of a power transmission for a motor vehicle, and particularly to an vent apparatus for allowing air to enter and leave the case while preventing ingress of water and contaminants to the case.

A sealed transmission case requires a vent due to changes that occur in the temperature of the air held in the transmission case. The equation of state or characteristic equation of a perfect gas, derived from Boyle's law and either of Charles' laws for an ideal gas, states $p*V=w*R*T$, wherein p is gas pressure, V is gas volume, w is weight of the gas, R is the gas constant, and T is gas temperature. If the volume of air in the transmission case is constant due to the case being sealed, then changes in the temperature of air in the transmission case would cause pressure within the case to increase and decrease. If the transmission case were not vented and the temperature of air in the sealed volume of the case were increased, air pressure within the case would increase. That increase in air pressure in the case could cause transmission fluid to be forced from the case through the fill tube provided to add transmission fluid to the case. A decrease in air pressure could cause water or contaminants to enter the case past external transmission seals. Therefore, a transmission case is vented to maintain a zero pressure differential between its interior and the ambient, atmospheric air pressure.

However, venting the transmission case to allow air to enter the case through a vent while preventing water and contaminants from being drawn into the transmission case presents challenging technical issues. There is a need to provide a simple, inexpensive, yet reliable technique for admitting air through a vent and excluding water and other contaminants from entering the transmission case through the vent.

SUMMARY OF THE INVENTION

A system for separating contaminants from an airstreams entering a sealed case through a vent fitting communicating to the interior cavity of the case includes a contaminant separator having a housing enclosing a chamber, an inlet and outlet communicating with the chamber, a baffle located in the chamber and producing a constricted fluid flow passageway between the inlet and the outlet. A bottom surface within the chamber supports material separated from an airstreams that passes between the inlet and the outlet. The separated contaminants can exit the housing through a drain in the bottom surface.

The contaminant separator is formed of molded plastic to prevent corrosion and is readily stored at a high elevation in the engine compartment of a motor vehicle a short distance from the transmission case so that a hose connecting them is also short. The contaminant separator housing includes a baffle which prevents entry of water and solid contaminants in to the case.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
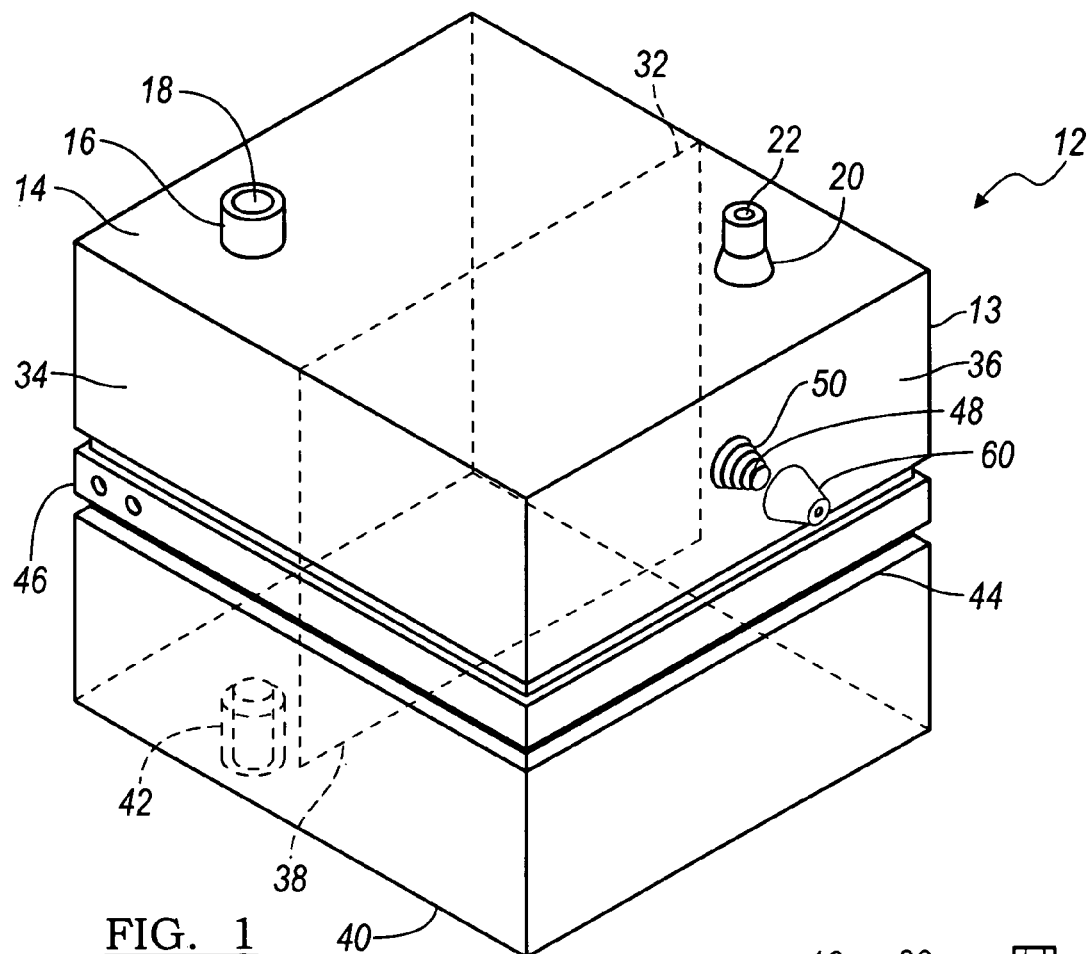
FIG. 1 is an isometric view of a contaminant separator for separating entrained contaminants from air entering a transmission case.
Figure 3:
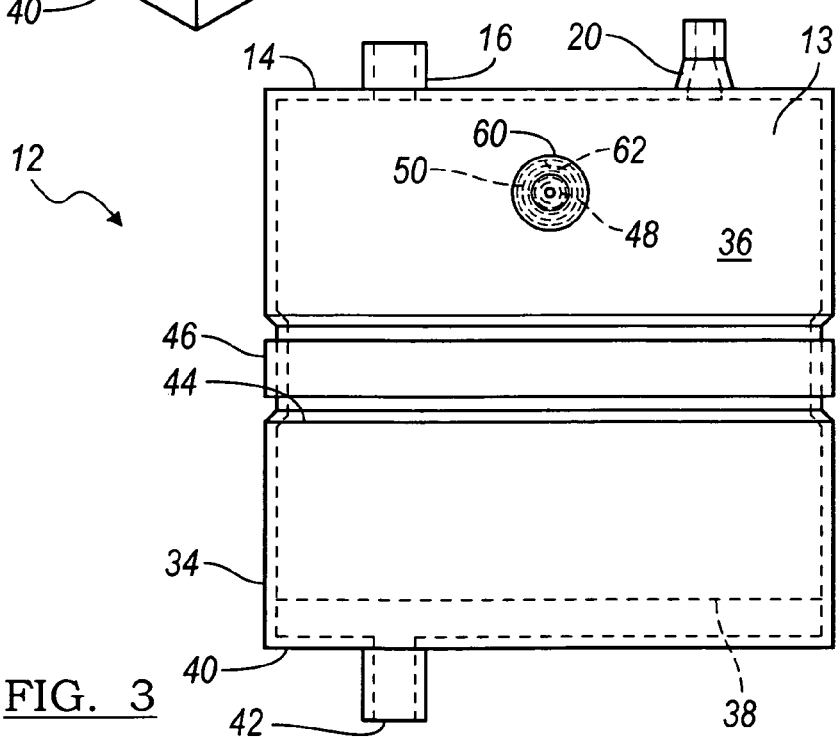
FIG. 3 is a side view of the contaminant separator illustrated in FIG. 1.
Figure 2:
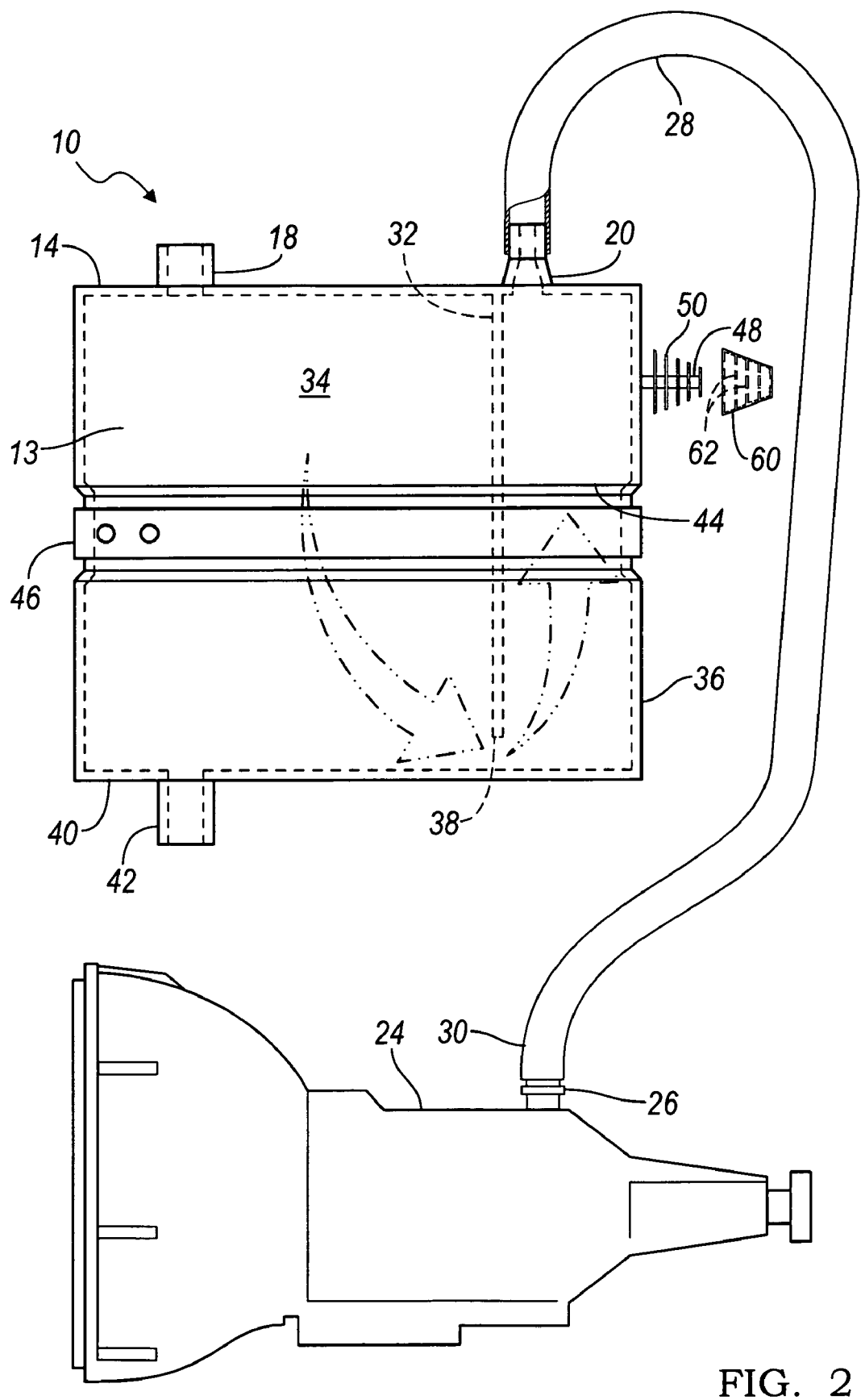
FIG. 2 is front view of the contaminant separator illustrated in FIG. 1.

FIGS. 1-3 show a system 10 including a contaminant separator 12 for separating liquid, such as water, and solid contaminants from air entering a transmission case. The contaminant separator 12 includes a thin walled housing 13 preferably formed of molded plastic. The housing 13 is in the form of a hollow, six-faced container, all of whose faces are rectangles lying in pairs of parallel planes, such as a cube, the length of each edge being about two inches. However, the housing may be spherical or another suitable shape. The top 14 supports an inlet 16, such as a fitting, which extends about 0.25 inches above the plane of the top, the inlet 16 having an opening 18 communicating with the interior of the contaminant separator 12 and through which atmospheric air enters and leaves the contaminant separator. The top 14 also supports a outlet 20, such as nozzle, which extends about 0.25 inches above the plane of the top, the outlet 20 having an opening 22 communicating with the interior of the of the contaminant separator 12 and through which air leaves the separator and enters the transmission case 24 through a vent fitting 26 located on the case 24. Outlet nozzle 20 is formed to receive and retain thereon the end of a flexible hose 28, whose opposite end 30 is secured to the vent fitting 26 on the transmission case 24.

In one embodiment the interior of the contaminant separator 12 is a single chamber divided by a baffle 32 located between the intake air fitting 16 and the transmission case supply nozzle 20. The baffle 32 is supported on and secured to the inner surfaces of the top 14, front side 34 and rear side 36. The baffle 32 has a free edge 38, which is spaced about 0.125 inches above the inner surface of the bottom 40.

Ambient air entering the contaminant separator 12 through fitting 16 flows downward and along the baffle 32, past its free edge 38, and then upward to and through the transmission case air supply nozzle 20. This circuitous route around the baffle 32 causes water droplets and other contaminants to strike the baffle 32 and to fall onto the inner surface of the bottom 40, thereby preventing the contaminants from being carried along in the stream of incoming air to the transmission case supply nozzle 20. As a result, most of the water and entrained contaminants entering the contaminant separator 12 through the air intake fitting 16 drop to the bottom surface 40 and can be removed from the contaminant separator 12 through a drain fitting 42 located there.

A channel 44 encircling the contaminant separator housing 13 and located approximately mid-way between the top 14 and bottom 40 provides a recess in which a band or zip-tie 46 engages the housing 12 and is secured preferably in the engine compartment of the vehicle, in which the transmission case 24 is installed. In this way, the contaminant separator housing 13 can be secured against movement in the vehicle.

Figure 4:
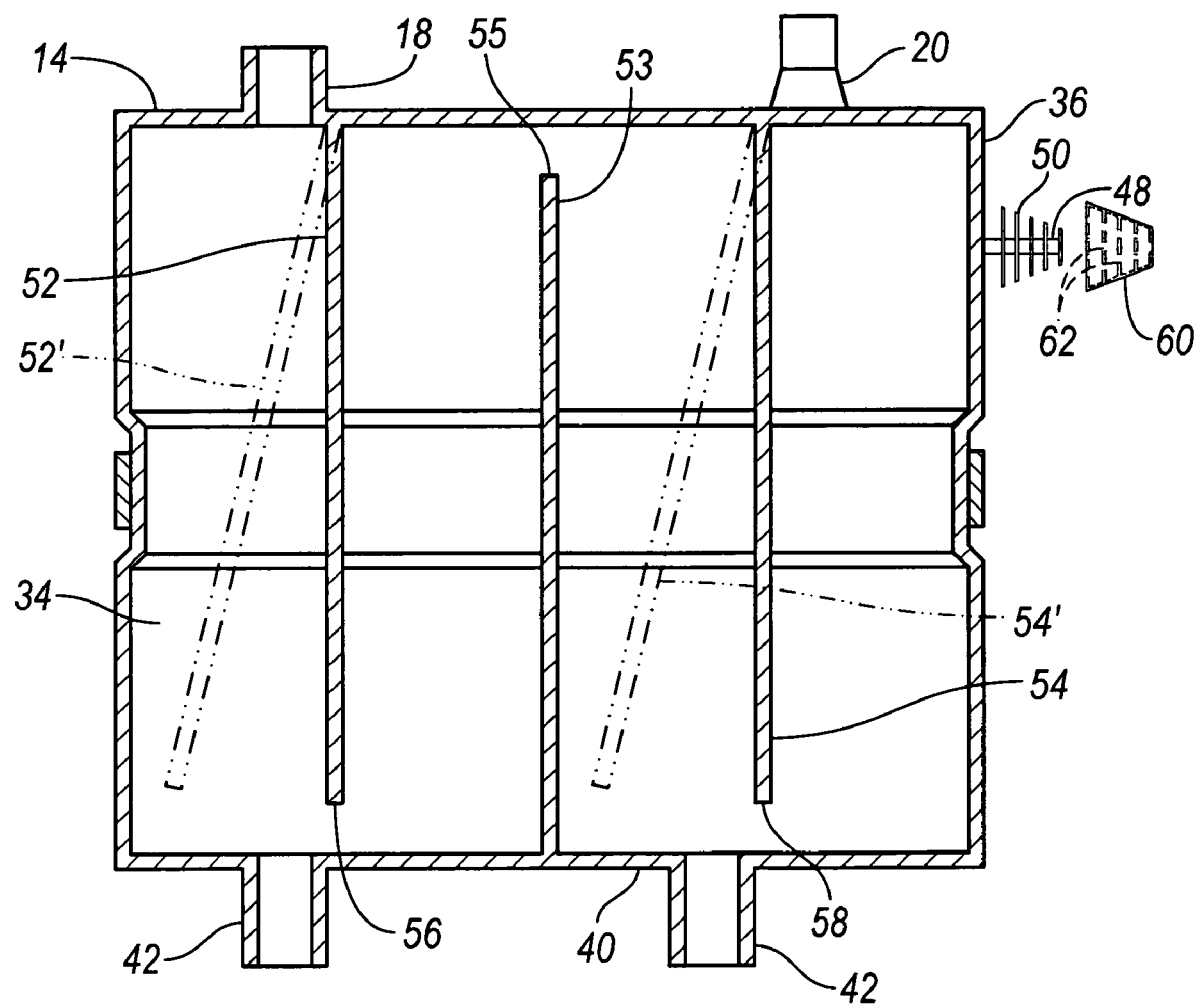
FIG. 4 is front view of an alternate embodiment of a contaminant separator containing multiple baffles.

FIG. 4 illustrated a second embodiment, in which an alternate contaminant separator 50 includes three baffles 52, 53, 54 between the inlet 18 and outlet 20. The baffles 52, 53, 54 may be planar and substantially normal to the top 14, planar and inclined respect to the top, or arcuate, as shown. The intermediate baffle 53 includes a free edge 55 that is spaced about 0.125 inches from the inner surface of the top 14. The left side outer baffle 52 includes a free edge 56 that is spaced about 0.125 inches from the inner surface of the bottom 40. The right side outer baffle 54 includes a free edge 58 that is spaced about 0.125 inches from the inner surface of the bottom 40.

Ambient air entering the contaminant separator 50 through fitting 16 flows downward and along the baffle 52, across its free edge 38, upward between baffles 52 and 53, across the free edge 55 of baffle 53, downward between baffles 53 and 54, across the free edge 58 of baffle 54, and upward to and through the transmission case air supply nozzle 20. Most of the water and entrained contaminants entering the contaminant separator 50 through the air intake fitting 16 drop to the bottom surface 40 and can be removed from the contaminant separator 12 through a drain fitting 42.

Alternatively, the contaminant separator housing 13 may be secured to the vehicle using a member 48 with flexible, tapered, circular serrations 50 on its outer surface, commonly called a Christmas tree, located on the side 36 of the contaminant separator housing 13. A receptacle 60, of the type commonly used in the automotive industry, which is secured to the vehicle, includes flexible, tapered, circular serrations 62, which resiliently engage the serrations 50 of the Christmas tree connector member 48, thereby securing housing 13 in its correct location in the vehicle.

Although the preferred embodiments have been described with reference to a transmission case 24, such as a case containing the mechanical, hydraulic, and electronic components of an automatic transmission or manual transmission, the case 24 may contain other components, such as those for a power transfer device, such as a transfer case, which selective transmits rotating power from a transmission output shaft to a secondary drive shaft and a secondary set of vehicle wheels when four-wheel drive operation is desired.

In accordance with the provisions of the patent statutes, the preferred embodiment has been described. However, it should be noted that the alternate embodiments can be practiced otherwise than as specifically illustrated and described.

What is claimed is:

1. A system for separating contaminants from an air stream, comprising:
   a transmission case enclosing an interior cavity;
   a housing enclosing a chamber and including a channel encircling an outer surface of the housing;
   a band located in the channel for limiting movement of the housing;
   an inlet communicating with the chamber,
   an outlet communicating with the chamber and the transmission case; and
   a baffle located in a flow path between the inlet and the outlet, including an edge spaced from a surface of the housing to produce a constricted fluid flow passageway across which edge air and airborne contaminants flow from the inlet to the outlet.

2. The system of claim 1, further comprising:
   a drain secured to a bottom surface of the housing and through which contaminants can exit the housing.

3. A system for separating contaminants from an air stream, comprising:
   a transmission case that encloses an interior cavity;
   a housing enclosing a chamber and including a tor wall, bottom wall, side walls, and a channel formed in the side walls and encircling the housing;
   a band located in the channel for limiting movement of the housing;
   an inlet secured to the top wall and communicating with the chamber;
   a outlet secured to the top and communicating with the chamber and the transmission case; and
   a first baffle located in a flow path between the inlet and the outlet, including a free edge spaced from the bottom wall to produce a constricted fluid flow passageway across which air and airborne contaminants flow from the inlet to the outlet.

4. The system of claim 3, further comprising:
   a drain secured to the bottom wall, through which contaminants can exit the housing.

5. The system of claim 3, further comprising:
   a second baffle located in a flow path between the inlet and the outlet, including a second free edge spaced from the bottom to produce a second constricted fluid flow passageway across which air and airborne contaminants flow from the inlet to the outlet; and
   an intermediate baffle located between the first baffle and the second baffle in a flow path between the inlet and the outlet, including a third free edge, providing a third constricted fluid flow passageway across which air and airborne contaminants flow from the inlet to the outlet.

6. A method for separating tangible material from an air stream, comprising the steps of:
   (a) providing a transmission case that encloses a cavity;
   (b) providing a housing including an enclosed chamber having an inlet and an outlet, a channel formed in wall of the housing, and a band located in the channel;
   (c) locating a baffle in a flow path between the inlet and the outlet;
   (d) using a free edge of the baffle to produce a constricted fluid flow passageway across which air and airborne contaminants flow from the inlet to the outlet;
   (e) containing within the chamber material separated from an air stream that flows around the baffle between the inlet and the outlet;
   (f) pneumatically communicating the outlet and the interior cavity of the case; and
   (g) using the band to secure the housing against movement.

7. The method of claim 6 further comprising the step of:
   continually allowing tangible material in the chamber to exit the chamber through a drain.

8. The method of claim 6 wherein:
   step (c) further comprises locating multiple baffles within the housing; and
   step (d) further comprises using a free edge of each of the baffles to produce multiple constricted fluid flow passageways across which air and airborne contaminants flow from the inlet to the outlet.

* * * * *